US009189765B2

(12) United States Patent
Heydon et al.

(10) Patent No.: US 9,189,765 B2
(45) Date of Patent: Nov. 17, 2015

(54) SYSTEM AND METHOD FOR MANAGING A RESOURCE

(75) Inventors: Amy Heydon, Scottsdale, AZ (US);
Greg Keeley, New York, NY (US);
Daniel Puleri, New Hyde Park, NY (US); Orville A. Williams, Phoenix, AZ (US); Abdul G Balogun, Allen, TX (US); Zeeshan Ishaq, Phoenix, AZ (US)

(73) Assignee: III Holdings 1, LLC, Wilmington, DE (US)

(*) Notice: Subject to any disclaimer, the term of this patent is extended or adjusted under 35 U.S.C. 154(b) by 773 days.

(21) Appl. No.: 13/104,850

(22) Filed: May 10, 2011

(65) Prior Publication Data

US 2012/0291039 A1  Nov. 15, 2012

(51) Int. Cl.
*G06F 9/46* (2006.01)
*G06Q 10/06* (2012.01)

(52) U.S. Cl.
CPC .................................. *G06Q 10/0637* (2013.01)

(58) Field of Classification Search
None
See application file for complete search history.

(56) References Cited

U.S. PATENT DOCUMENTS

| 7,039,915 | B2* | 5/2006 | Kavoori et al. | 718/104 |
|---|---|---|---|---|
| 7,970,903 | B2* | 6/2011 | Oeda | 709/226 |
| 2003/0005398 | A1* | 1/2003 | Cho et al. | 716/8 |
| 2004/0136379 | A1* | 7/2004 | Liao et al. | 370/395.21 |
| 2005/0033619 | A1* | 2/2005 | Barnes et al. | 705/7 |
| 2005/0262508 | A1* | 11/2005 | Asano et al. | 718/100 |
| 2006/0085836 | A1* | 4/2006 | Lyons et al. | 726/1 |
| 2006/0112130 | A1* | 5/2006 | Lowson | 707/102 |
| 2008/0097891 | A1* | 4/2008 | Park | 705/37 |
| 2008/0215409 | A1* | 9/2008 | Van Matre | 705/8 |
| 2009/0138883 | A1* | 5/2009 | McLean | 718/104 |
| 2009/0276419 | A1* | 11/2009 | Jones et al. | 707/5 |
| 2011/0093853 | A1* | 4/2011 | Bobak et al. | 718/100 |
| 2011/0109472 | A1* | 5/2011 | Spirakis et al. | 340/870.02 |
| 2012/0117625 | A1* | 5/2012 | Ray | 726/4 |

* cited by examiner

*Primary Examiner* — Emerson Puente
*Assistant Examiner* — Mehran Kamran
(74) *Attorney, Agent, or Firm* — Meyertons, Hood, Kivlin, Kowert & Goetzel, P.C.

(57) ABSTRACT

Systems and methods for managing a resource are disclosed. Resource may include vendors, suppliers, partners and the like. The systems allow users to conduct a weighted analysis of various resources and compare multiple resources on the same scale. Moreover, the systems are configured to grade various resources based on their strategic value to a business. This analysis and the resulting strategic value may be based on qualitative data provided by users and quantitative data captured from the business relationship between the business and the resource.

17 Claims, 3 Drawing Sheets

SYSTEM AND METHOD FOR MANAGING A RESOURCE

FIELD OF THE INVENTIONS

The present disclosure generally relates to management of resources, and more particularly, to a method and system for evaluating resources based on quantitative information and qualitative information.

BACKGROUND OF THE INVENTIONS

Large businesses are typically geographically and culturally diverse, segmented, and employ thousands of people. These factors may make it difficult to share information regarding resources used by a particular business. For example, a first business unit may use a resource to provide a service. A second business unit may require the same resource, but may be unaware that the resource provides the service to the first business unit. Moreover, even if the second business unit is aware that the resource provides the service to the first business unit, there is often no sufficient way for the second business unit to understand how the resource performs for the first business unit.

As such, it is desirable to a business to identify and quantify the performance of its resources. Moreover, it is desirable to a business to have a uniform process and scale to assess and evaluate resource performance, in order to communicate the capabilities of the resource across a diverse business.

SUMMARY OF THE INVENTIONS

The present disclosure describes systems, methods and computer readable media for managing a resource. Resources may include, for example, vendors, partners, suppliers, and the like. The systems and methods disclosed herein may be configured to receive or capture qualitative data and quantitative data for a particular resource, based on the resource's performance. A score for each resource may be determined based on the qualitative and quantitative data associated with the resource. Each of the qualitative and quantitative data may be associated with a predefined selectable scale or may be captured as raw data. Based on this score, the resource may be assigned to one or more categories corresponding to the strategic value of the resource to a business. The strategic value may be displayed in a variety of ways including, for example, on a plot, in a chart, as text and/or the like. Moreover, the strategic value may allow one resource to be compared to another resource based on the same scale of strategic value. The strategic value may also be evaluated and adjusted over time based on data continually collected for the resource, or tasks and associated feedback for the resource.

The systems and methods of the present disclosure may be configured to capture qualitative and quantitative data from users and from business resources such as, for example, purchasing systems, program management metrics, and the like. This qualitative and quantitative value may be analyzed using, for example, weighting systems, threshold rules, historical trends and the like.

BRIEF DESCRIPTION OF THE DRAWINGS

A more complete understanding of the present disclosure may be derived by referring to the detailed description and claims when considered in connection with the Figures, wherein like reference numbers refer to similar elements throughout the Figures, and:

DETAILED DESCRIPTION

The present disclosure provides systems and methods to quantify the importance, quality, and performance of a particular resource such that diverse business units have baseline information for selecting and/or evaluating resources.

"User" may include any individual, customer, cardmember, employee, contractor, group, participant, beneficiary, account holder, account owner, recipient, charitable organization, software, hardware, and/or other entity that has an interest in the system.

"Resource" may include any individual, entity, contractor, group, participant, beneficiary, vendor, partner, supplier, or any other entity that provides an item to a business.

Phrases and terms similar to an "item" may include any good, service, information, experience, reward, points, coupons, credits, monetary equivalent, anything of value, something of minimal or no value, etc.

The terms "transaction", "purchase" and similar terms may be used interchangeably, and include any monetary or non-monetary agreement, exchange, negotiation, procedure, arrangement or other type of deal. The transaction may or may not include an exchange of an item.

Figure 1:
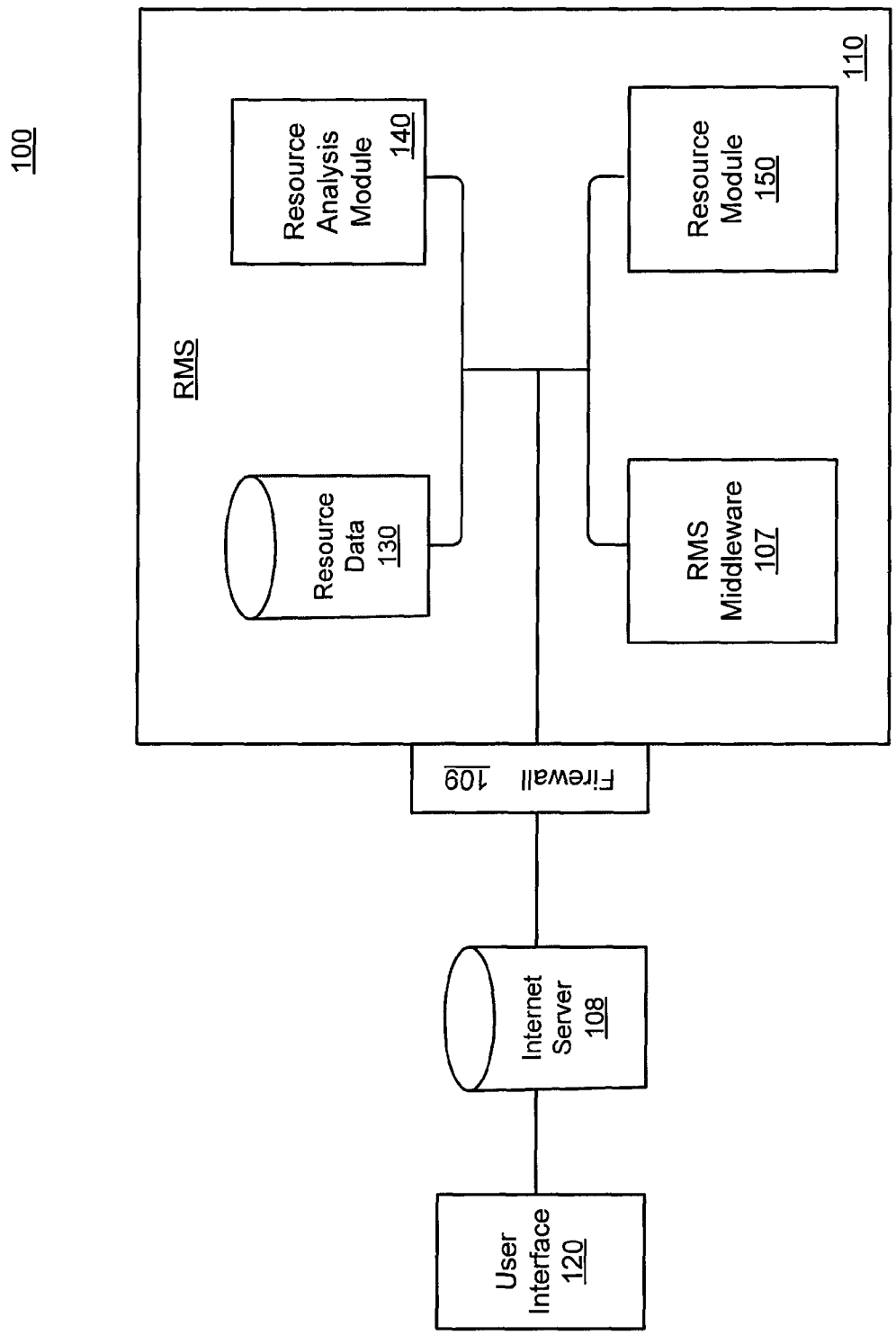
FIG. 1 is a block diagram illustrating major system components for managing a resource, in accordance with an exemplary embodiment.

With reference to FIG. 1, and in accordance with an embodiment, system 100 may be any system configured to track, manage, analyze, identify, plot, display, manipulate, interpret, satisfy, and/or store resource data associated with a business. System 100 may monitor, request, receive, detect and/or acquire data from users, resources, business, and/or the like. In an exemplary embodiment, system 100 comprises a resource management system ("RMS") 110 in electronic communication with a user interface 120.

RMS 110 may be any hardware or hardware-software system configured to manage resource information. RMS 110 may comprise an RMS middleware 107, resource data module 130, a resource analysis module 140, and a resource access module 150. RMS 110 may be configured to interface with user interface 120 over a network. RMS 110 and user interface may be connected or configured to communicate through any suitable hardware or hardware-software configuration including for example, an internet server and a firewall.

User interface 120 may be any hardware or hardware-software system configured to process and/or present information. User interface 120 may be configured to receive, request, manipulate, display, and update information. User interface 120 may be configured with a login to allow access to information from RMS 110. User interface 120 may communicate the login information or identity of a user, based on the login information provided by the user to RMS 110. In response to obtaining the identity information from user interface 120, RMS 110 may identify information available to the identified user based on a user predefined preferences or predetermined rules. User interface 120 may be configured as a gateway or portal for access to RMS 110 (e.g., by a user and/or a resource). User interface 120 may be connected to RMS 110 such that data provided by a user at user interface 120 is transmitted to RMS 110.

Figure 2:
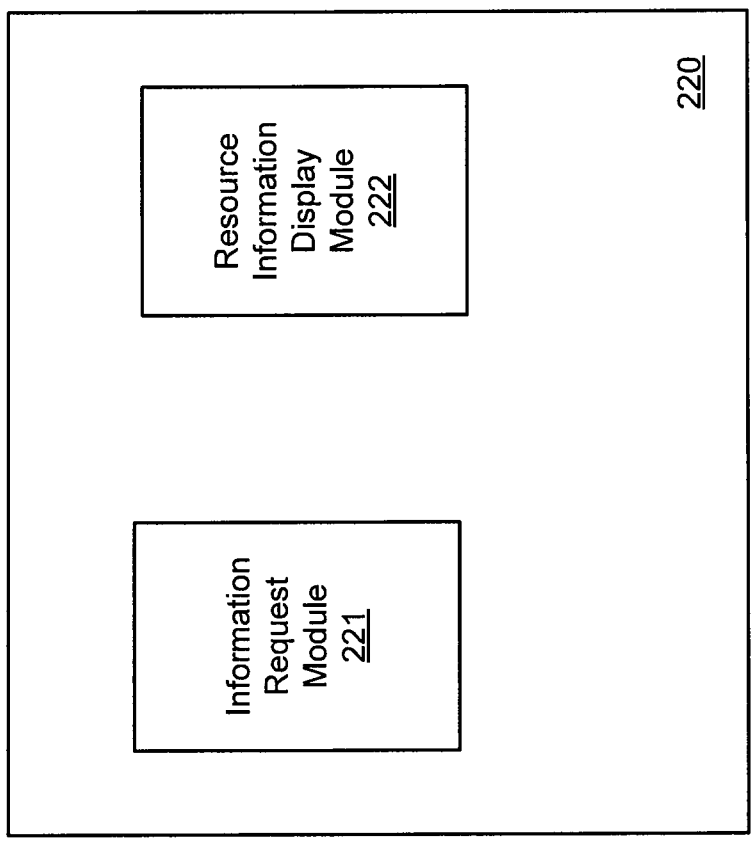
FIG. 2 is an exemplary user interface, in accordance with an exemplary embodiment.

In one embodiment, and with reference to FIG. 2, user interface 220 may comprise an information request module 221 and a resource information display module 222. Information request module 221 may be any hardware or hardware-software system configured to request and receive data about a resource. For example, information request module 221 may comprise one or more prompts or questions and associated fields for user provided data. The prompt may be a request to provide information, which may include a solicitation for quantitative data and/or qualitative data. The field may be configured with a suggested, predefined scale. The scale may be selectable by a user as part of the information solicited. The prompt may also request non-predefined user provided information. The field corresponding to the prompt may be configured to receive data about a resource as text, as a computer file, as a user selection, or as any other suitable medium.

Information display module 222 may be any hardware and/or software system configured to access and/or display information about a resource from RMS 110. User interface 220 may comprise selectable fields or search fields. In response to a specific user selection or search, information display module may be configured to access RMS 110, identify resource data corresponding to the user selection or search and/or display that data to the user. Where multiple sets of resource data correspond to the selection or search, information display module 222 may request additional selections or search terms from the user or may provide the user with one or more links to each set of corresponding resource data. For example, a user may select telecommunications vendors or may search for voice and data service providers through information display module 222. In response to either query, information display module 222 may select one or more resources corresponding to the search (e.g. AT&T and Verizon). In response to one or more resources being provided, information display module 222 may present the user with a link to each resource. Based on the user selection of the presented links, information resource 222 may be configured to present resource data to the user through user interface 220. The resource data may be presented in any suitable format including, for example a chart, a graph, text and the like. The data may be processed at user interface 220 or may be processed at RMS 110 and provided to user interface 220 for review by the user.

In an embodiment, and with reference again to FIG. 1, resource data module 130 may be any hardware and/or software system configured to receive, associate, parse, store, recall, and/or transmit resource information. Resource data module 130 may be coupled to various systems, modules and data sources including, for example, purchasing management systems, account payable systems, accounting systems, and the like. Resource data module 130 may be configured to actively accumulate resource information such as, for example, resource cost information, deliverable management information, program management metrics, user provided information (e.g., quantitative and qualitative information), and the like. For example, resource data module 130 may be configured to monitor, collect, and store cost information from various telecommunications providers used by a business. Resource data module 130 may parse the cost information by specific cost types (e.g., cost codes), such that each piece of cost data may be stored distinctly, and subsequently recalled based on a request from RMS 110. Resource data module 130 may be coupled to or in electronic communication with resource analysis module 140.

Resource analysis module 140 may be any hardware or hardware-software system configured to access, request, receive, analyze, parse, configure, or manipulate resource data. Resource analysis module 140 may be coupled to an in electronic communication with user interface 120 and/or resource data module 130. Resource analysis module 140 may comprise a set of predefined rules. These predefined rules may allow resource analysis module 140 to evaluate and/or analyze quantitative and qualitative resource data provided by a user or stored in resource data module 130.

These predefined rules may include a weighting system. The weighting system may be configured to provide a baseline analysis given the variety of factors that may effect the evaluation of a resource. For example, various factors may be weighted differently such that a less important resource is not evaluated higher than a more important resource. The predefined rules may also include thresholds. These thresholds may be configured to normalize resource data. For example, resources with very high costs may reach a predetermined threshold and may be assigned an equal rating. While the costs associated with each resource may not be the same, the costs are sufficiently high such that both resources may be equally important. The weighting system and thresholds may be defined by historical data, by key business objectives, or by any other suitable rationale.

Resource analysis module 140 may be configured to evaluate and/or categorize analyzed resource data. The analysis may include assigning a category or indicator to a resource based on the analysis of the resource data in view of the predefined rules. For example, resource analysis module 140 may be configured to assign a resource to one of a plurality of categories based on the analysis of the qualitative data associated with the resource. Similarly, resource analysis module 140 may be configured to assign a resource to a category of a plurality of categories based on the analysis of the quantitative data associated with the resource. Based on the categorization of the resource corresponding to each of the qualitative analysis and the quantitative analysis, resource analysis module 140 may be configured to associate an overall indicator to the resource.

The overall indicators may be determined based on a set of predetermined rules governing the strategic value of a resource to a business generally. For example, a business may define various levels of strategic value and associated indicators based on quantitative performance (e.g., cost or resources for on-time deliverable performance) and qualitative performance (e.g., an employees perception about the ability to work with the resource or the willingness of a resource to help an employee).

The overall indicator may be associated with a grading system, such as for example, tiers 1-4. Each tier and associated indicator may provide a summary of the general strategic value of the resource to the business based on a sliding scale of importance. These tiers may be represented to a user in any fashion. For example, where there are four tiers, resources may be represented graphically in quadrants. The graphical representation may further be defined by an axis associated with a tier's corresponding quantitative data and an axis associated with a tier's qualitative data. This type of representation provides a uniform baseline (e.g., scale) for evaluation of unrelated resource. Moreover, the representation allows a user to quickly and visually identify the varying strategic value of each of a plurality of resources.

Resource analysis module 140 may be configured to associate tasks with a resource or group of resources based on the indicator, strategic value, or tier of a resource. Resource analysis module 140 may also be configured to track, monitor, and/or capture progress associated with the specific task. Moreover, resource analysis module 140 may be configured to collect qualitative and quantitative data associated with the task. This task data may be further analyzed by resource analysis module 140 to refine the indicator, strategic value, or tier of a resource. This task data may also be used to validate the indicator, strategic value, or tier of a resource.

Resource access module 150 may be any hardware and/or software system configured to receive, request, capture, display, and/or analyze resource data. Resource access module 150 may be configured to provide a resource with a certain level of access to system 100. Based on this access, the resource may be able to review quantitative and qualitative data associated with the resource. Moreover, the resource may be able to review and complete associated tasks. Resource access module 150 may include a benchmarking capability based on a previous grading (e.g. the tier the resource has been assigned based on one or more prior quantitative assessments and/or qualitative assessments). This allows the resource to observe its progress and/or perception with a business.

Moreover, the benchmarking capability may provide a user from the business the ability to allocate the correct services (e.g. periodic reviews, a dedicated resource manager, an increase in the volume of items purchased from the resource) to the resource based on the corresponding grading and/or tier. Trending analysis may be used to identify the progress of the resource through the grading scale (e.g. is the resource improving or declining such that an exit strategy is required). The benchmarking capability and/or associated trending analysis be configured to cause RMS 110 to suggest services that may be requested by a resource through resource access module 150.

Figure 3:
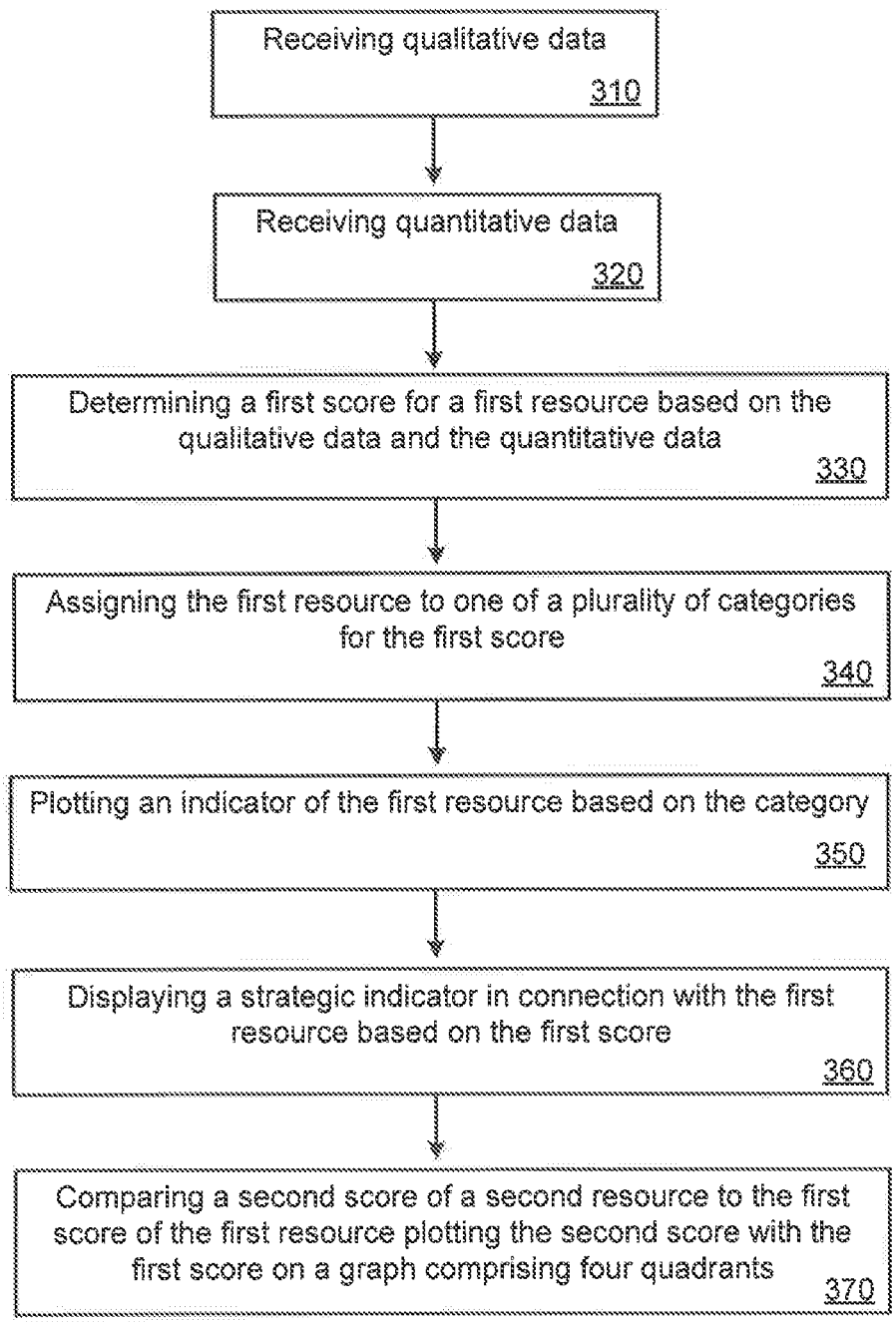
FIG. 3 is a flow chart illustrating an exemplary process for managing a resource, in accordance with an exemplary embodiment.

In an embodiment, and with reference to FIGS. 1 and 3, system 100 may be configured to receive qualitative data for a first resource through at least one of user interface 120 and resource data module 130 (Step 310). Similarly, system 100 may be configured to receive quantitative data for a first resource through at least one of user interface 120 and resource data module 130 (Step 320). System 100 may be configured to determine a score for the first resource based on the quantitative and qualitative data at resource analysis module 140 (Step 330). The resource analysis module 140 may be configured with predetermined rules including, for example, a weighting system and/or threshold values as discussed above. These scores allow system 100 to assign the resource to one of a plurality of categories (step 340). These categories may correspond to the strategic value of a business.

This process may be repeated for one or more resources, such that the systems and methods described herein are able to evaluate and display data for a plurality of resources based on the same scale (Step 370). This allows a user to quickly evaluate the extent of a resources impact or strategic value to a business in the context of other resources. For example, system 100 may be configured to plot one or more resources on a uniform manner (e.g., a normalized scale) based on the category or score associated with the resource (Step 350). Moreover, the plot may include and/or display other information including for example, a strategic indicator (Step 360). This indicator may correspond to one or more tasks or business objectives associated with the resource.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products for resource management and implementing resource management tools are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the particular machines disclosed herein, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; resource data; financial institution data; and/or like data useful in the operation of the system. As those skilled in the art will appreciate, user computer may include an operating system (e.g., Windows NT, 95/98/2000, XP, Vista, OS2, UNIX, Linux, Solaris, MacOS, etc.) as well as various conventional support software and drivers typically associated with computers. A user may include any individual, business, entity, government organization, software and/or hardware that interact with a system.

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of obtaining data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data tocomputers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific business or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the business, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, resource, business, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated business-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall includes any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

RMS Middleware may include any hardware and/or software suitably configured to facilitate communications and/or process transactions between disparate computing systems. RMS Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The resource has a computing unit implemented in the form of a computer-server, although other implementations are contemplated by the system. The business has a computing center shown as a main frame computer. However, the business computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The electronic commerce system may be implemented at the business and resource. In an exemplary implementation, the electronic commerce system is implemented as computer software modules loaded onto the business computer system and the resource computing center.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method, comprising:
    obtaining, by a computer based system for managing resource, first qualitative data, wherein the first qualitative data includes risk data;
    obtaining, by the computer bases system, first quantitative data;
    determining, by the computer based system, a first score for a first resource based on the first qualitative data and the first quantitative data, wherein the first score is determined at least in part based on a threshold associated with at least one attribute of the first qualitative data and the first quantitative data;
    normalizing, by the computer based system, the first score based on a first weight of a first factor and a second weight of a second factor,
        wherein, based on the normalizing, the first score is indicative of a normalized business value of the resource, and
        wherein the first factor is associated with first qualitative data and the second factor is associated with first quantitative data;
    ranking, by the computer based system, the resource among a plurality of resources based on the business value associated with the first score;
    assigning, by the computer based system, the first resource to a category of a plurality of categories, at least partially based upon the first score; and
    plotting, by the computer based system, an indicator of the first resource based on the first score and the category with the plurality of resources.

2. The method of claim 1, wherein each of the plurality of categories is defined by a range of quantitative data.

3. The method of claim 1, wherein each of the plurality of categories is defined by a range of qualitative data.

4. The method of claim 1, wherein the plurality of categories comprises a first category, a second category, a third category, and a fourth category.

5. The method of claim 1, wherein qualitative data is provided by a user.

6. The method of claim 1, further comprising adjusting, by the computer based system, the first score based on updated first qualitative data and updated first quantitative data.

7. The method of claim 1, further comprising displaying, by the computer based system and based on the first score, a strategic indicator in connection with the first resource.

8. The method of claim 1, further comprising requesting, by the computer based system and from a user, the first qualitative data and the first quantitative data.

9. The method of claim 1, further comprising comparing, by the computer based system, a second score of a second resource to the first score of the first resource.

10. The method of claim 9, further comprising plotting, by the computer based system, the second score with the first score on a graph comprising four quadrants.

11. The method of claim 1, wherein the first score is determined based on a weighting system.

12. The method of claim 1, wherein a task is assigned to the first resource based on the first score.

13. The method of claim 12, further comprising:
    monitoring, by the computer based system, the task; and
    adjusting, by the computer based system, the first score based on completion of the task.

14. The method of claim 1, wherein the qualitative data is associated with a predefined, selectable scale.

15. The method of claim 1, wherein the first score is modified by at least one of a weighting system and a threshold, and wherein at least one of the weighting system and the threshold is defined by historical data.

16. A non-transitory, tangible computer-readable storage medium having computer-executable instructions stored thereon that, if executed by a computer based system for managing a resource, cause the computer based system to perform a method comprising:
    obtaining, by the computer based system, first qualitative data, wherein the first qualitative data includes risk data;
    obtaining, by the computer bases system, first quantitative data;
    determining, by the computer based system, a first score for a first resource based on the first qualitative data and the first quantitative data, wherein the first score is determined at least in part based on a threshold associated with at least one attribute of the first qualitative data and the first quantitative data;
    normalizing, by the computer based system, the first score based on a first weight of a first factor and a second weight of a second factor,
        wherein, based on the normalizing, the first score is indicative of a normalized business value of the resource, and
        wherein the first factor is associated with first qualitative data and the second factor is associated with first quantitative data;
    ranking, by the computer based system, the resource among a plurality of resources based on the business value associated with the first score;
    assigning, by the computer based system, the first resource to a category of a plurality of categories, at least partially based upon the first score; and
    plotting, by the computer based system, an indicator of the first resource based on the first score and the category with the plurality of resources.

17. A computer based system for satisfying a transaction amount, comprising:
    a network interface communicating with a non-transitory memory;
    the memory communicating with a processor for managing a resource; and
    the processor, when executing a computer program, is configured to perform the method comprising:
    obtaining, by the processor, first qualitative data, wherein the first qualitative data includes risk data;
    obtaining, by the processor, first quantitative data;
    determining, by the processor, a first score for a first resource based on the first qualitative data and the first quantitative data, wherein the first score is determined at least in part based on a threshold associated with at least one attribute of the first qualitative data and the first quantitative data;
    normalizing, by the processor, the first score based on a first weight of a first factor and a second weight of a second factor,
        wherein, based on the normalizing, the first score is indicative of a normalized business value of the resource, and
        wherein the first factor is associated with first qualitative data and the second factor is associated with first quantitative data;

ranking, by the processor, the resource among a plurality of resources based on the business value associated with the first score;
assigning, by the processor, the first resource to a category of a plurality of categories, at least partially based upon the first score; and
plotting, by the processor, an indicator of the first resource based on the first score and the category with the plurality of resources.

* * * * *